US012712578B2

(12) United States Patent
Park et al.

(10) Patent No.: US 12,712,578 B2
(45) Date of Patent: Aug. 18, 2026

(54) ELECTRONIC DEVICE AND METHOD OF CONTROLLING SPURIOUS EMISSION

(71) Applicant: SAMSUNG ELECTRONICS CO., LTD., Suwon-si (KR)

(72) Inventors: Seongyong Park, Suwon-si (KR); Gilyong Ku, Suwon-si (KR); Hyunjun Kim, Suwon-si (KR); Jungsik Min, Suwon-si (KR); Seunghee Son, Suwon-si (KR); Jiyeong Yu, Suwon-si (KR); Jungeun Lee, Suwon-si (KR); Myungkyoon Chung, Suwon-si (KR); Janghoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 18/734,822

(22) Filed: Jun. 5, 2024

(65) Prior Publication Data

US 2024/0429948 A1 Dec. 26, 2024

Related U.S. Application Data

(63) Continuation of application No. PCT/KR2024/003803, filed on Mar. 27, 2024.

(30) Foreign Application Priority Data

Jun. 22, 2023 (KR) ........................ 10-2023-0080398
Jul. 25, 2023 (KR) ........................ 10-2023-0096982

(51) Int. Cl.
*H04B 1/04* (2006.01)
*H04W 52/24* (2009.01)

(52) U.S. Cl.
CPC ........ *H04B 1/0475* (2013.01); *H04W 52/243* (2013.01); *H04B 2001/0416* (2013.01)

(58) Field of Classification Search
CPC .......... H04B 1/0475; H04B 2001/0408; H04B 2001/0433; H04B 2001/0416;
(Continued)

(56) References Cited

U.S. PATENT DOCUMENTS 8,364,104 B2 1/2013 Cohen
8,879,665 B2 11/2014 Xia et al.
(Continued)

FOREIGN PATENT DOCUMENTS

CN 115001513 A 9/2022
KR 10-1295756 B1 8/2013
(Continued)

OTHER PUBLICATIONS

International Search Report (PCT/ISA/210) issued on Jun. 25, 2024 by the International Searching Authority in International Patent Application No. PCT/KR2024/003803.
(Continued)

*Primary Examiner* — Keith Ferguson
(74) *Attorney, Agent, or Firm* — Sughrue Mion, PLLC

(57) ABSTRACT

Disclosed are an electronic device and a method of controlling a spurious emission. A spurious emission is identified by setting a first time interval in which a feedback receiver operates in a spurious emission detection mode, and identifying a spurious emission from the electronic device by analyzing a feedback signal obtained by the feedback receiver based on a first resolution bandwidth and a second resolution bandwidth in the first time interval.

18 Claims, 8 Drawing Sheets

(58) Field of Classification Search
CPC .. H04B 1/1027; H04W 52/243; H04W 52/24; H04W 52/18; H04W 52/241; H04W 52/248
See application file for complete search history.

(56) References Cited

U.S. PATENT DOCUMENTS

| | | | | |
|---|---|---|---|---|
| 9,369,219 | B1 * | 6/2016 | Goedken | H04B 1/0475 |
| 9,537,519 | B2 | 1/2017 | El-Hassan et al. | |
| 9,705,612 | B2 | 7/2017 | Goedken | |
| 10,784,972 | B2 | 9/2020 | Axmon et al. | |
| 11,502,760 | B2 | 11/2022 | Cho et al. | |
| 2012/0077450 | A1 | 3/2012 | Cohen | |
| 2012/0281777 | A1 * | 11/2012 | Ho | H04B 1/0475 375/267 |
| 2016/0072530 | A1 | 3/2016 | El-Hassan et al. | |
| 2016/0269130 | A1 | 9/2016 | Goedken | |
| 2021/0028872 | A1 | 1/2021 | Cho et al. | |
| 2022/0109498 | A1 | 4/2022 | Vaez-Ghaemi et al. | |

FOREIGN PATENT DOCUMENTS

| | | | |
|---|---|---|---|
| KR | 10-2016-0096288 | A | 8/2016 |
| KR | 10-2243154 | B1 | 4/2021 |

OTHER PUBLICATIONS

Written Opinion (PCT/ISA/237) issued on Jun. 25, 2024 by the International Searching Authority in International Patent Application No. PCT/KR2024/003803.

* cited by examiner

ELECTRONIC DEVICE AND METHOD OF CONTROLLING SPURIOUS EMISSION

CROSS-REFERENCE TO RELATED APPLICATIONS

This application is a continuation application of International Application No. PCT/KR2024/003803 designating the United States, filed on Mar. 27, 2024, in the Korean Intellectual Property Receiving Office and claiming priority to Korean Patent Application No. 10-2023-0080398, filed on Jun. 22, 2023, and Korean Patent Application No. 10-2023-0096982, filed on Jul. 25, 2023, in the Korean Intellectual Property Office, the disclosures of which are incorporated by reference herein in their entireties.

BACKGROUND

1. Field

The embodiments of the present disclosure relate to an electronic device and a method of controlling a spurious emission.

2. Description of Related Art

In wireless communication systems, a spurious emission refers to a radio frequency (RF) signal generated at a frequency other than a target frequency of operation. Excessive spurious emission from an electronic device may interfere with the operation of other electronic devices or systems. A separate measurement device (e.g., a spectrum analyzer) may be used to check conducted spurious emissions (CSE) from an electronic device.

The above information may be presented as the related art to help with the understanding of the disclosure. No arguments or decisions are made as to whether any of the above is applicable as a prior art related to the disclosure.

In order to handle CSE issues in real time, an electronic device needs to determine a spurious emission by itself and control the spurious emission.

The technical goals to be achieved are not limited to those described above, and other technical goals not mentioned above are clearly understood by one of ordinary skill in the art from the following description.

SUMMARY

Provided herein is an electronic device including: a memory storing instructions; and at least one processor electrically connected to the memory and configured to execute the instructions, wherein, based on the instructions being executed by the at least one processor, the at least one processor causes the electronic device to control a plurality of operations, and wherein the plurality of operations includes: setting a first time interval in which a feedback receiver operates in a spurious emission detection mode, obtaining a feedback signal in a first frequency band via the feedback receiver based on a first resolution bandwidth in the first time interval, determining whether a spurious emission is in the frequency band by analyzing the feedback signal, and in response to determination that the spurious emission is in the frequency band, determining whether a spurious emission is in a second frequency band included in the first frequency band based on a second resolution bandwidth narrower than the first resolution bandwidth, wherein the feedback signal corresponds to a radio frequency (RF) signal amplified by a power amplifier of the electronic device.

Also provided herein is a method of determining a spurious emission of an electronic device, the method including: setting a first time interval in which a feedback receiver operates in a spurious emission detection mode, obtaining a feedback signal in a first frequency band via the feedback receiver based on a first resolution bandwidth in the first time interval, determining whether a spurious emission is in the frequency band by analyzing the feedback signal, and in response to determination that the spurious emission is in the frequency band, determining whether a spurious emission is in a second frequency band included in the first frequency band based on a second resolution bandwidth narrower than the first resolution bandwidth, wherein the feedback signal corresponds to a radio frequency (RF) signal amplified by a power amplifier of the electronic device.

According to an embodiment, a computer-readable storage medium storing one or more computer programs may include instructions that cause at least one processor to perform the method.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
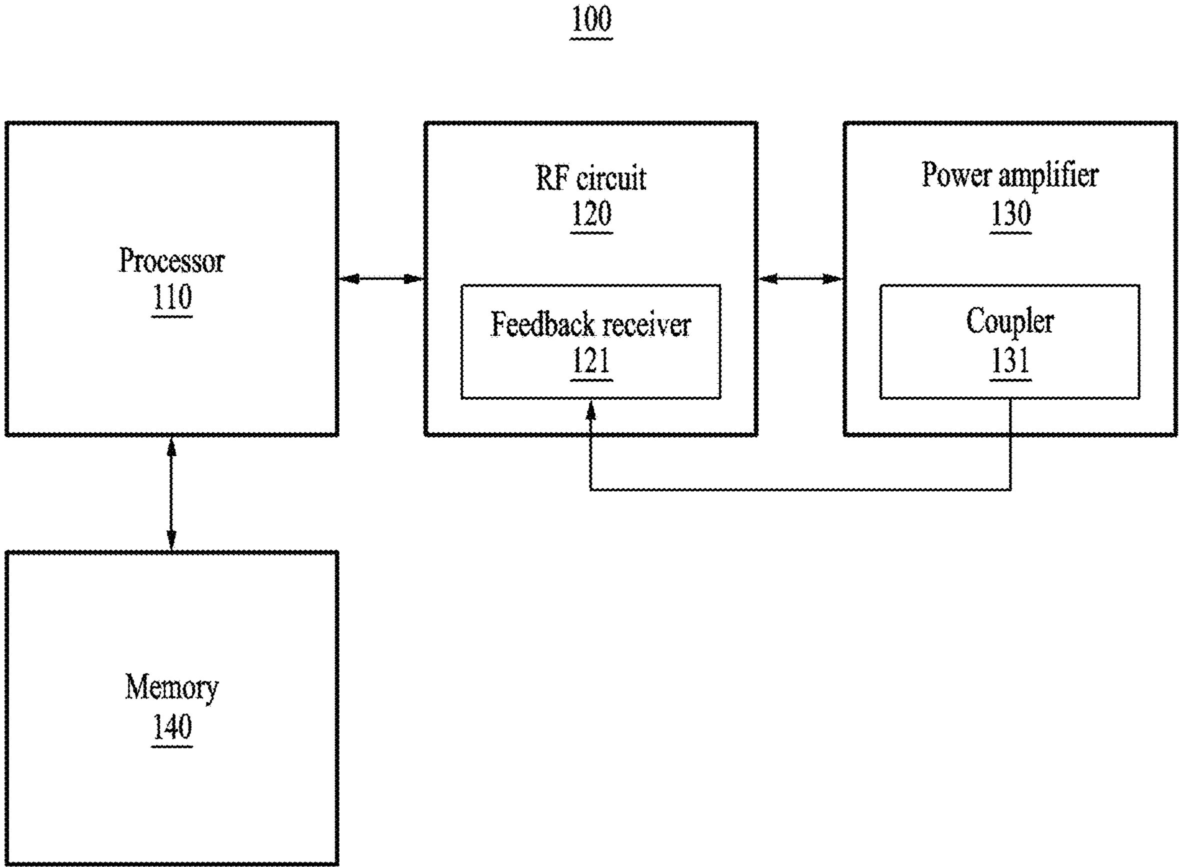
FIG. 1 is a schematic block diagram of an electronic device according to an embodiment.

Hereinafter, embodiments will be described in detail with reference to the accompanying drawings. When describing the embodiments with reference to the accompanying drawings, like reference numerals refer to like components, and any repeated description related thereto will be omitted.

FIG. 1 is a schematic block diagram of an electronic device according to an embodiment.

Figure 9:
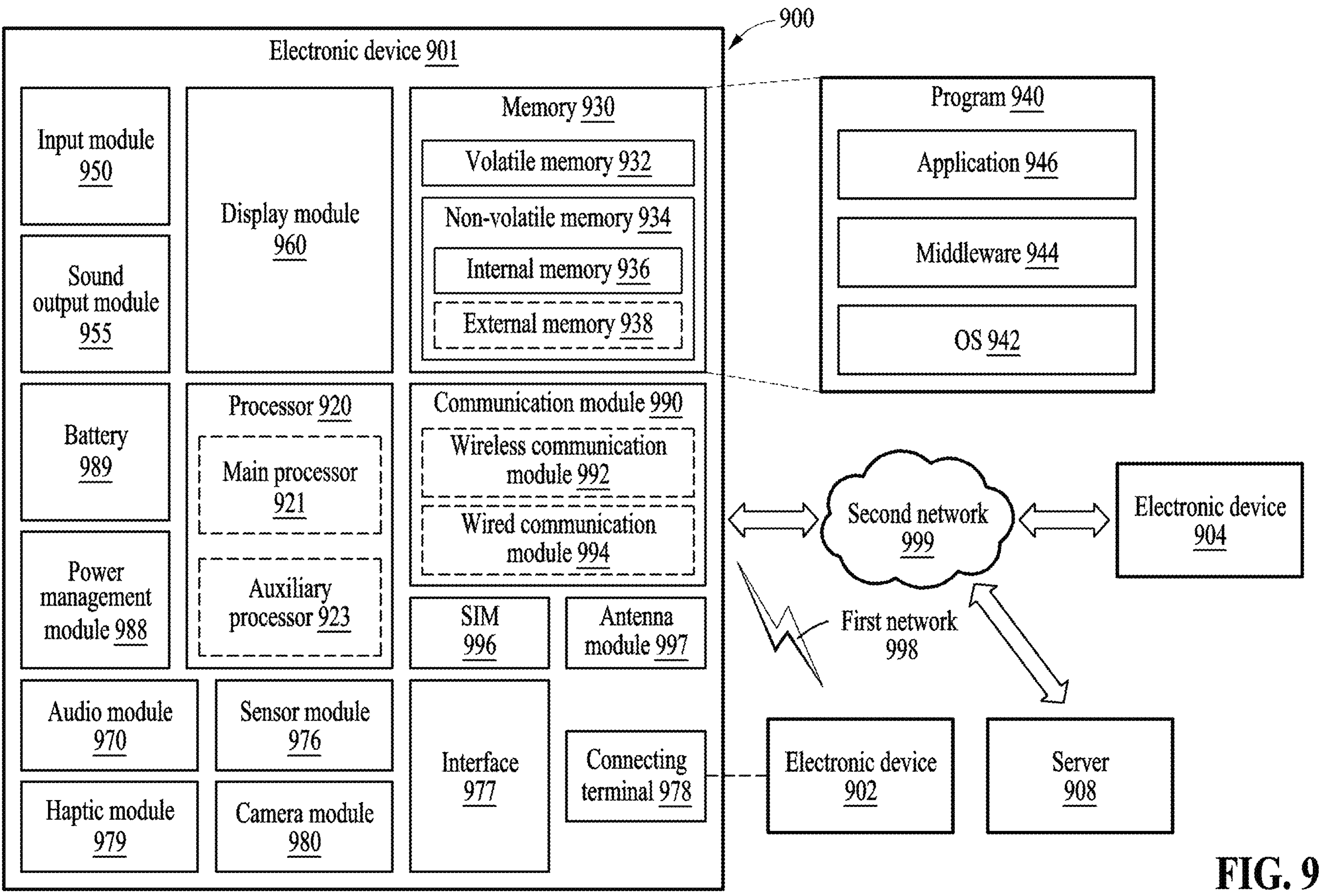
FIG. 9 is a block diagram of an electronic device in a network environment according to an embodiment.

Referring to FIG. 1, according to an embodiment, an electronic device 100 (e.g., an electronic device 901 of FIG. 9) may include a processor 110 (e.g., the processor 920 of FIG. 9), a radio frequency (RF) circuit 120 (e.g., a radio frequency integrated circuit (RFIC)), a power amplifier (PA) 130, and a memory 140 (e.g., a memory 930 of FIG. 9). FIG. 1 schematically illustrates the electronic device 100 to describe the operation of the electronic device 100, and it will be apparent to one of ordinary skill in the art that the scope of rights in the disclosure is not limited thereto. The configuration of the electronic device 100 may be implemented in various forms. For example, the PA 130 may be implemented as part of the RF circuit 120.

According to an embodiment, the processor 110 (e.g., a communication processor) may determine a spurious emission, and reduce a spurious emission level by performing PA biasing.

According to an embodiment, the processor 110 may perform processing, amplification, filtering, modulation, and/or demodulation of RF signals for wireless communication (e.g., cellular communication).

According to an embodiment, the RF circuit 120 may include a feedback receiver (or FBRx) 121. The feedback receiver 121 may receive feedback signals for amplified RF signals from a coupler 131 of the PA 130. The feedback signals may include information about the amplified RF signals.

According to an embodiment, the PA 130 may amplify the power of the RF signals to a level suitable for transmission. The amplified RF signals may be routed by a RF switch.

According to an embodiment, the PA 130 may include the coupler 131. The coupler 130 may be used to obtain feedback signals for RF signals amplified by the PA 130. The feedback signals may include at least a portion of the amplified RF signals.

According to an embodiment, the feedback signals may provide information about the performance and/or characteristics of the electronic device 100, and may be used for the operation of the electronic device 100. For example, the feedback signals may be used for transmission power compensation, spurious emission control, and/or automatic gain control. The feedback signals may be transmitted to the feedback receiver 121.

According to an embodiment, the memory 140 may store instructions (or programs) executable by the processor 110. For example, the instructions may include instructions for executing the operation of the processor 110 and/or the operation of each component of the processor 110.

Figure 2:
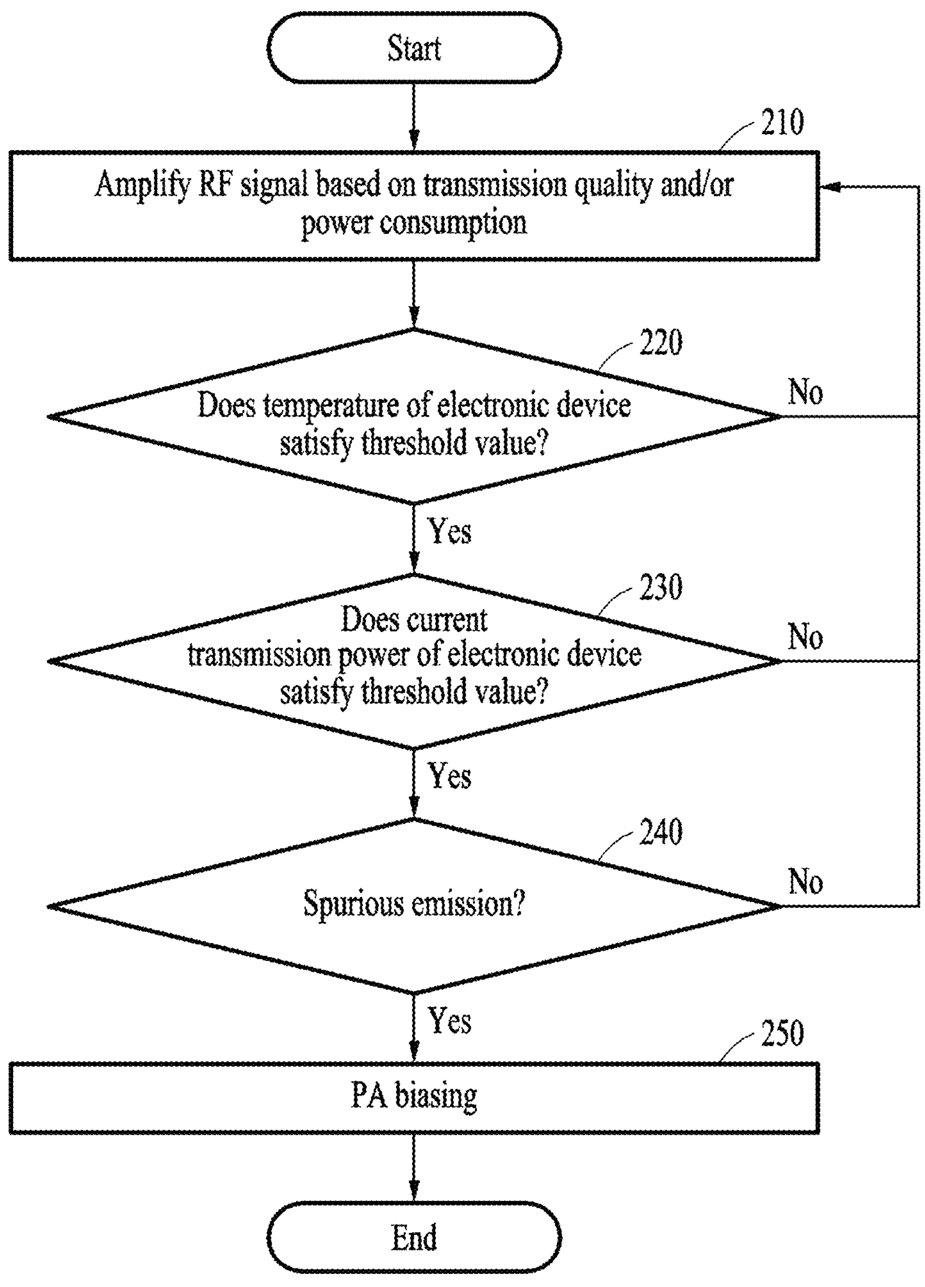
FIG. 2 is a flowchart illustrating a spurious emission control according to an embodiment.

FIG. 2 is a flowchart illustrating a spurious emission control according to an embodiment. Referring to FIG. 2, according to an embodiment, operations 210 to 250 may be sequentially performed, but are not limited thereto. For example, an operation (e.g., operation 220 or operation 230) may be omitted, the order of some operations (e.g., operations 220 and 230) may be changed, or two or more operations (e.g., operations 220 and 230) may be performed in parallel.

In operation 210, according to an embodiment, an electronic device (e.g., the electronic device 100 of FIG. 1) may amplify a RF signal based on a transmission quality and/or a power consumption. For example, the electronic device 100 may amplify the RF signal by applying a PA bias current that satisfies restrictions relating to the transmission quality and minimizes the power consumption to a PA (e.g., the PA 130 of FIG. 1).

According to an embodiment, the electronic device 100 may amplify the RF signal based on information about an application such as a type of application requiring communication, in addition to the transmission quality and the power consumption. For example, the application of the electronic device 100 may require a signal quality corresponding to the type of application (e.g., a voice call application, an online gaming application, or a video streaming application), and the electronic device 100 may amplify the RF signal based on the type of application while the application is executed.

According to an embodiment, the electronic device 100 may amplify the RF signal based on communication metrics other than the examples mentioned above. For example, the electronic device 100 may amplify the RF signal based on communication metrics such as a transmission path of the RF signal, interference due to unwanted signals, a target coverage, and/or a target signal-to-noise ratio (SNR).

In operation 220, according to an embodiment, the electronic device 100 may determine whether the temperature of the electronic device 100 satisfies a threshold value. A spurious emission level of the electronic device 100 may be affected by the temperature of the electronic device 100. The electronic device 100 may set the temperature of the electronic device 100 corresponding to a spurious emission limit as the threshold value. For example, the electronic device 100 may determine whether the temperature of the electronic device 100 is less than or equal to a first temperature (e.g., 15 degrees Celsius) or whether the temperature of the electronic device 100 is greater than or equal to a second temperature (e.g., 40 degrees Celsius). According to an embodiment, the electronic device 100 may determine not only the temperature of the electronic device 100 but also whether other factors (e.g., the humidity) that may affect a spurious emission of the electronic device 100 satisfy a predetermined threshold value. The electronic device 100 may perform operation 230 when the temperature of the electronic device 100 satisfies the threshold value. The electronic device 100 may amplify the RF signal based on one or more of the transmission quality, the power consumption, the information about the application, and the communication metrics when the temperature of the electronic device 100 does not satisfy the threshold value.

In operation 230, according to an embodiment, the electronic device 100 may determine whether the current transmission power of the electronic device 100 satisfies a threshold value. The threshold value may be a value corresponding to the maximum transmission power of the electronic device 100 (e.g., half of the maximum transmission power). The electronic device 100 may amplify the power of the RF signal using the PA 130, and the maximum transmission power of the electronic device 100 may be determined based on the characteristics (e.g., a linear interval) of the PA 130. The electronic device 100 may perform operation 240 when the current transmission power of the electronic device 100 satisfies the threshold value. The electronic device 100 may amplify the RF signal based on one or more of the transmission quality, the power consumption, the information about the application, and the communication metrics when the current transmission power of the electronic device 100 does not satisfy the threshold value.

In operation 240, according to an embodiment, the electronic device 100 may determine a spurious emission from the electronic device 100. The process for determining a spurious emission will be described in detail with reference to FIGS. 3 to 6. The electronic device 100 may perform operation 250 when a spurious emission is present. The electronic device 100 may amplify the RF signal based on one or more of the transmission quality, the power consumption, the information about the application, and the communication metrics when a spurious emission is absent.

In operation 250, according to an embodiment, the electronic device 100 may perform PA biasing. For example, the electronic device 100 may reduce a spurious emission by adjusting the bias current of the PA 130. PA biasing will be described in detail with reference to FIG. 8.

Figure 3:
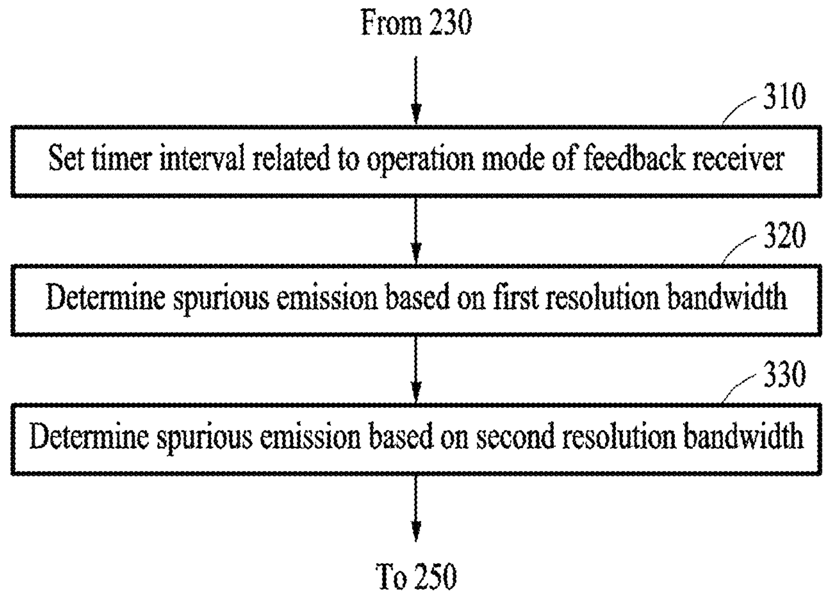
FIG. 3 is a flowchart illustrating a spurious emission detection according to an embodiment.
Figure 4:
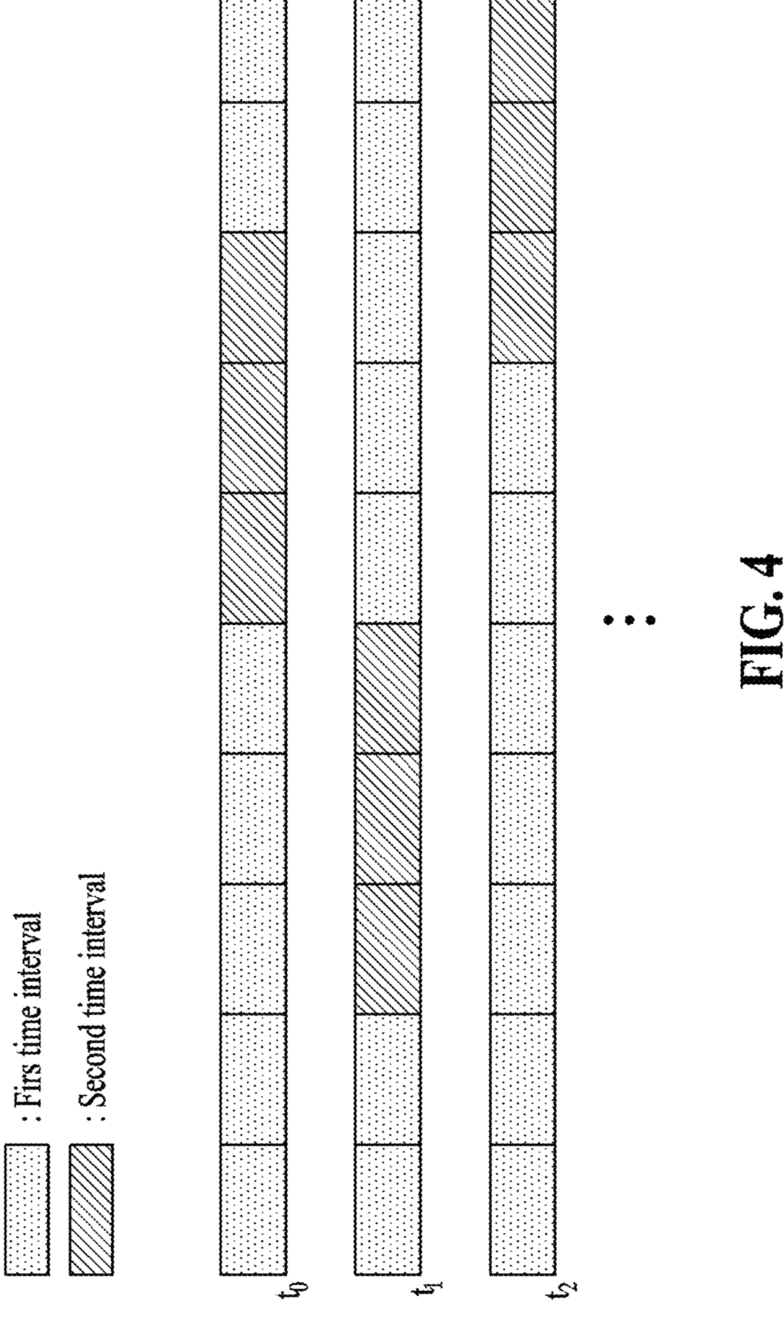
FIGS. 4 to 6 are diagrams illustrating an example of a spurious emission detection according to an embodiment.
Figure 5:
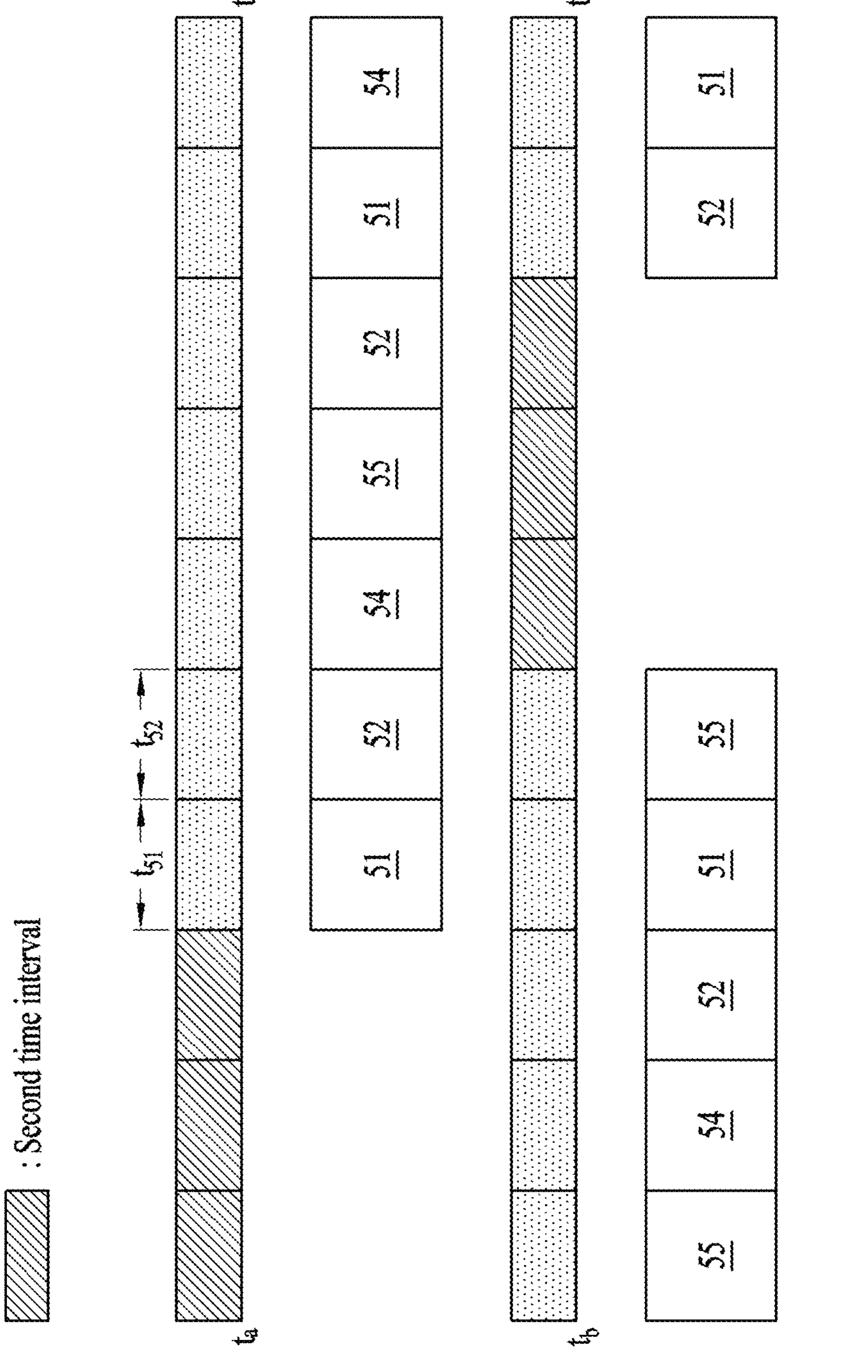
Figure 6:
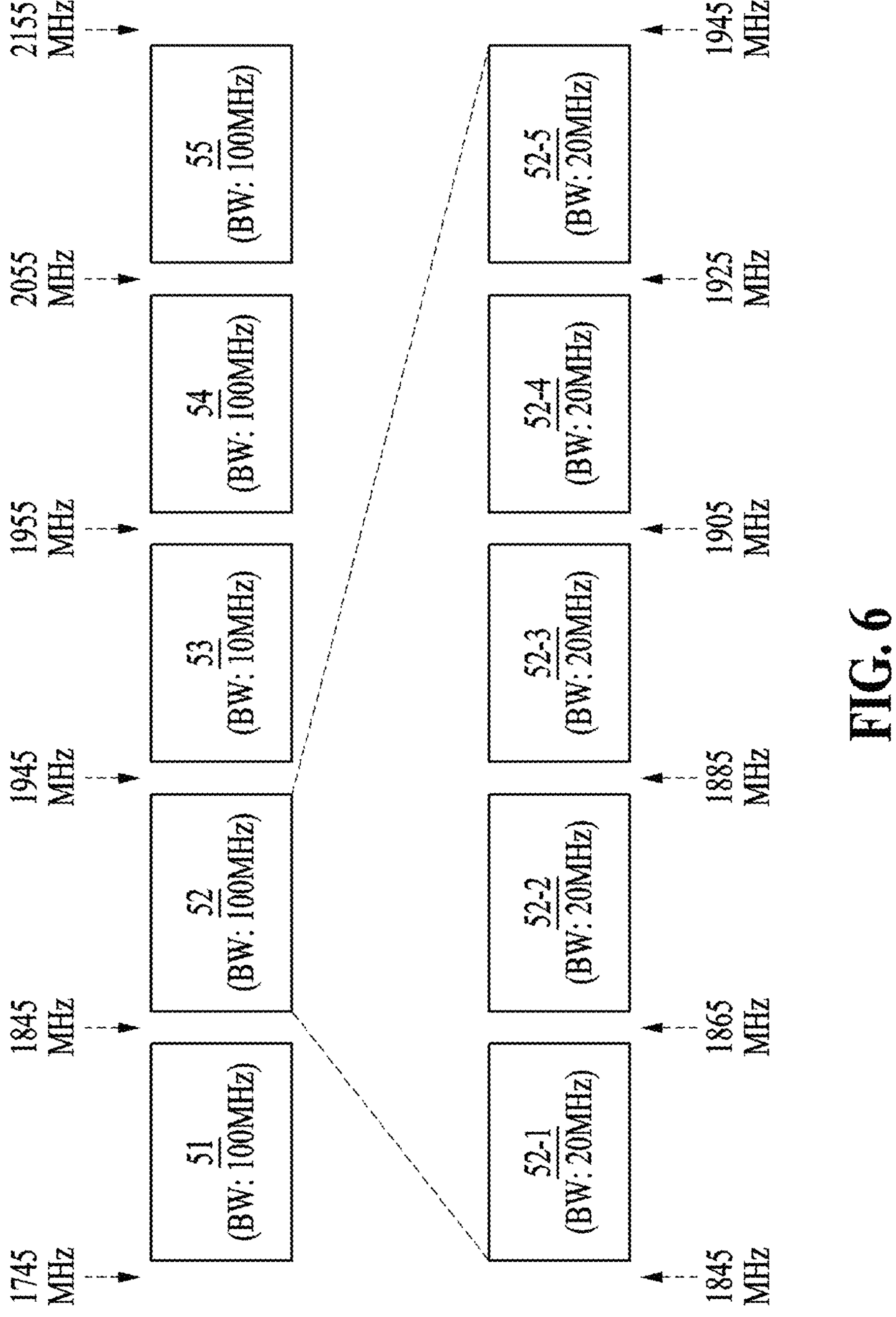

FIG. 3 is a flowchart illustrating a spurious emission detection according to an embodiment, and FIGS. 4 to 6 are diagrams illustrating an example of a spurious emission detection according to an embodiment.

Referring to FIG. 3, according to an embodiment, operations 310 to 330 may be performed sequentially, but are not limited thereto. For example, two or more operations may be performed in parallel, or one or more operations may be omitted.

In operation 310, according to an embodiment, an electronic device (e.g., the electronic device 100 of FIG. 1) may set a time interval for an operation mode (e.g., a transmission power compensation mode or a spurious emission detection mode) of a feedback receiver (e.g., the feedback receiver 121 of FIG. 1). The process of setting a time interval will be described in detail with reference to FIG. 4.

In operation 320, the electronic device 100 may determine a spurious emission from the electronic device 100 based on a first resolution bandwidth (e.g., 100 megahertz (MHz)). For example, the electronic device 100 may determine that a spurious emission is present when the power received by the feedback receiver 121 is higher than a white noise level. The process of detecting a spurious emission based on the first resolution bandwidth will be described in detail with reference to FIGS. 5 and 6.

In operation 330, the electronic device 100 may determine a spurious emission based on a second resolution bandwidth (e.g., 20 MHz) when a spurious emission is detected based on the first resolution bandwidth. The second resolution bandwidth may be narrower than the first resolution bandwidth. The process of detecting a spurious emission level based on the second resolution bandwidth will be described in detail with reference to FIG. 6.

Referring to FIG. 4, according to an embodiment, the electronic device 100 may set time intervals for operation modes (e.g., the transmission power compensation mode and the spurious emission detection mode) of the feedback receiver 121. For example, the electronic device 100 may randomly arrange a first time interval for the spurious emission detection mode and a second time interval for the transmission power compensation mode.

According to an embodiment, the electronic device 100 may randomly arrange the first time interval and the second time interval based on a predetermined time period (e.g., 10 milliseconds (ms)). Timepoints $t_0$, $t_1$, $t_2$, and $t_3$ may be start points or end points of time intervals scheduled based on the predetermined time period.

According to an embodiment, the electronic device 100 may detect a spurious emission with a high probability by randomly setting a plurality of time intervals. For example, if the first time interval and the second time interval are arranged periodically, and a spurious emission occurs periodically only within the second time interval, the electronic device 100 may not detect the spurious emission.

Referring to FIG. 5, according to an embodiment, the electronic device 100 may determine a spurious emission from the electronic device 100 within the first time interval. The electronic device 100 may detect a spurious emission from adjacent frequency bands (e.g., 1745 MHz to 1945 MHz and 1955 MHz to 2155 MHz) of a current transmission frequency band (e.g., 1945 MHz to 1955 MHz) based on a first resolution bandwidth. The electronic device 100 may randomly or periodically perform spurious emission detection for different frequency bands 51 to 55 within the first time interval. Detection time interval lengths (e.g., a detection time interval length $t_{51}$ and a detection time interval length $t_{52}$) for the frequency bands 51 to 55 may be the same or different. Timepoints $t_a$, $t_b$, and $t_c$ may be start points or end points of time intervals scheduled based on a predetermined time period (e.g., 10 ms).

Referring to FIG. 6, according to an embodiment, the electronic device 100 may analyze the adjacent frequency bands (e.g., 1745 MHz to 1945 MHz and 1955 MHz to 2155 MHz) of the current transmission frequency band (e.g., 1945 MHz to 1955 MHz) based on a first resolution bandwidth (e.g., 100 MHz). The electronic device 100 may divide the adjacent frequency bands into the plurality of frequency bands 51 to 55 based on the first resolution bandwidth, and perform spurious emission detection for each of the plurality of frequency bands 51 to 55 within the first time interval. When a spurious emission is detected in a predetermined frequency band, the electronic device 100 may analyze the frequency band in which the spurious emission is detected based on a second resolution bandwidth (e.g., 20 MHz). For example, when a spurious emission is detected in the frequency band 52, the electronic device 100 may divide the frequency band 52 into a plurality of frequency bands 52-1 to 52-5 based on the second resolution bandwidth (e.g., 20 MHz), and determine a spurious emission for each of the plurality of frequency bands 52-1 to 52-5 during the first time interval. For example, instead of determining the spurious emissions in frequency bands (e.g., frequency bands 53 to 55) scheduled for the spurious emission detection subsequent to the frequency band 52 in which the spurious emission has been detected, the electronic device 100 may determine whether a spurious emission is in the each of the plurality of frequency bands 52-1 to 52-5 during the first time interval.

For example, if, immediately prior to the start of the second time interval (e.g., within a preset time interval from the start of the second time interval), a spurious emission has been detected in a frequency band (e.g., frequency band 52) based on the first resolution bandwidth, the electronic device 100 may determine, during the first time interval immediately following the second time interval, a spurious emission in each of plurality of frequency bands (e.g., frequency bands 52-1 to 52-5) included in the frequency band (e.g., frequency band 52) based on the second resolution bandwidth.

According to an embodiment, the electronic device 100 may detect a spurious emission from the electronic device 100 based on the relatively wide first resolution bandwidth, thereby reducing the time for spurious emission detection.

According to an embodiment, the electronic device 100 may analyze the frequency band in which the spurious emission is detected based on the second resolution bandwidth narrower than the first resolution bandwidth, thereby precisely determining the location of the spurious emission and/or the level of the spurious emission. The electronic device 100 may adjust the second resolution bandwidth based on the measurement accuracy of spurious emission. For example, the electronic device 100 may analyze a frequency band using a narrow second resolution bandwidth when high measurement accuracy is required.

According to an embodiment, the second resolution bandwidth may be determined based on a target transmission quality and/or a surrounding environment of the electronic device 100. For example, when external electronic devices sensitive to interference, such as a medical device and/or a communication device, are located around the electronic device 100, a spurious emission of the electronic device 100 may need to be precisely controlled. The electronic device 100 may determine the measurement accuracy of spurious emission based on at least one of the types and numbers of the external electronic devices around the electronic device 100, and analyze a frequency band using a second resolution bandwidth corresponding to the determined measurement accuracy.

Figure 7:
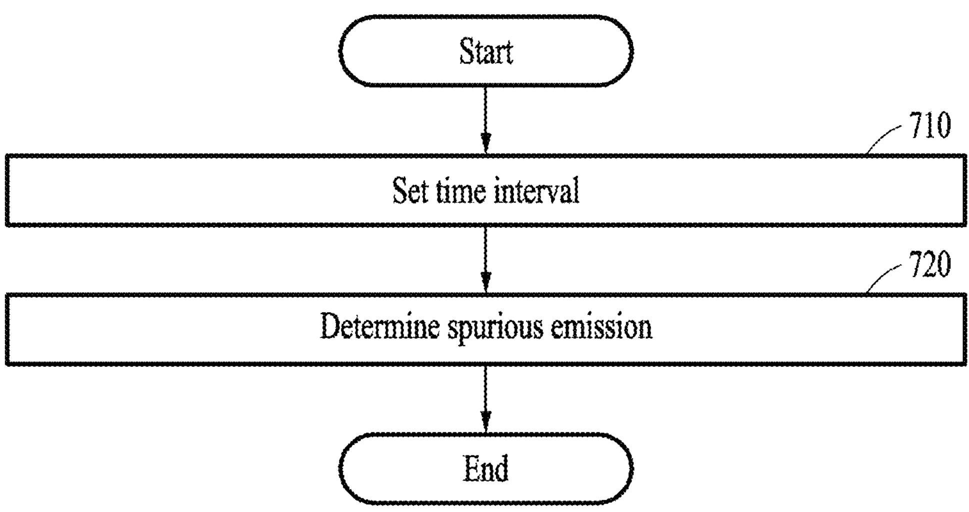
FIG. 7 is a flowchart illustrating an operation of an electronic device according to an embodiment.

FIG. 7 is a flowchart illustrating an operation of an electronic device according to an embodiment.

Referring to FIG. 7, according to an embodiment, operations 710 and 720 may be performed sequentially, but are not limited thereto. For example, operations 710 and 720 may be performed in parallel. Operations 710 and 720 may be substantially the same as the operation of an electronic device (e.g., the electronic device 100 of FIG. 1) described with reference to FIGS. 1 to 6. Accordingly, a repeated description thereof will be omitted.

In operation 710, according to an embodiment, the electronic device 100 may set a time interval for an operation mode of a feedback receiver (e.g., the feedback receiver 121 of FIG. 1). The feedback receiver 121 may have one or more operation modes. For example, the feedback receiver 121 may operate in a spurious emission detection mode within a first time interval (e.g., the first time interval of FIGS. 4 and 5), and operate in a transmission power compensation mode within a second time interval (e.g., the second time interval of FIGS. 4 and 5).

In operation 720, according to an embodiment, the electronic device 100 may determine a spurious emission from the electronic device 100 by analyzing a feedback signal obtained by the feedback receiver 121 based on a first resolution bandwidth (e.g., 100 MHz) and a second resolution bandwidth (e.g., 20 MHz) within the first time interval. The feedback signal may include information about frequency bands (e.g., the frequency bands 51 to 55 of FIGS. 5 and 6) adjacent to a current transmission frequency band of the electronic device 100.

According to an embodiment, the electronic device 100 may determine a spurious emission step by step based on the first resolution bandwidth and the second resolution bandwidth, thereby accurately determining the location and level of the spurious emission within a short period of time.

Figure 8:
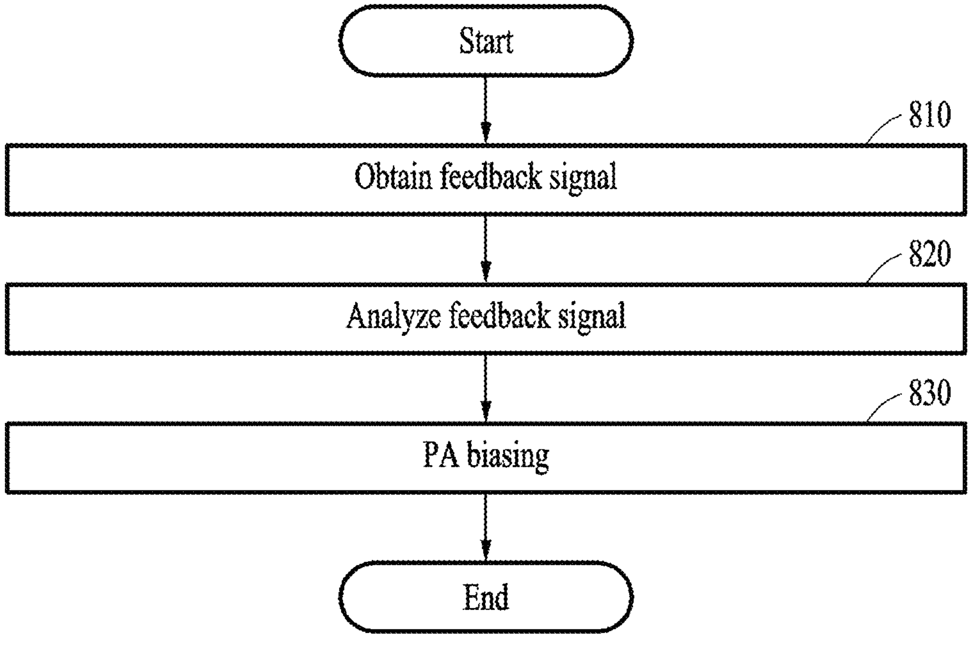
FIG. 8 is a flowchart illustrating an operation of an electronic device according to an embodiment.

FIG. 8 is a flowchart illustrating an operation of an electronic device according to an embodiment.

Referring to FIG. 8, according to an embodiment, operations 810 to 830 may be performed sequentially, but are not limited thereto. For example, two or more operations may be performed in parallel, or one or more operations may be omitted. Operations 810 to 830 may be substantially the same as the operation of an electronic device (e.g., the electronic device 100 of FIG. 1) described with reference to FIGS. 1 to 6. Accordingly, a repeated description thereof will be omitted.

In operation 810, according to an embodiment, the electronic device 100 may obtain a feedback signal using a feedback receiver (e.g., the feedback receiver 121 of FIG. 1) to determine a spurious emission from the electronic device 100. The feedback signal may include information about a RF signal amplified by a PA (e.g., the PA 130 of FIG. 1).

In operation 820, the electronic device 100 may analyze the feedback signal based on a first resolution bandwidth (e.g., 100 MHz) and a second resolution bandwidth (e.g., 20 MHz) narrower than the first resolution bandwidth.

In operation 830, the electronic device 100 may perform PA biasing based on the analysis of the feedback signal. For example, the electronic device 100 may select a bias current that minimizes a spurious emission level within a predetermined bias current range for the PA 130. The bias current range may be determined based on a transmission quality and/or a transmission power of the electronic device 100. For example, the bias current range may include a range of bias currents that satisfy a predetermined transmission quality and/or a predetermined transmission power. The bias current range may be stored in the memory 140 of the electronic device 100 in various forms (e.g., a non-volatile table).

The electronic device 100 may select a bias current optimized for the transmission quality and/or the transmission power when the spurious emission level becomes less than or equal to a threshold value by PA biasing. The electronic device 100 may perform PA biasing within a predetermined bias current range, thereby minimizing the spurious emission while maintaining the transmission quality.

FIG. 9 is a block diagram of an electronic device in a network environment according to an embodiment.

Referring to FIG. 9, the electronic device 901 in a network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)) or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed, or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950 or output the sound via the sound output module 955 or an external electronic device (e.g., an electronic device 902 such as a speaker or a headphone) directly or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high-definition multimedia interface (HDMI), a universal serial bus (USB) interface, a secure digital (SD) card interface, or an audio interface.

The connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and support direct (e.g., wired) communication or wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module, or a power line communication (PLC) module). A corresponding one of these communication modules may communicate with the external electronic device 904 via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multiple components (e.g., multiple chips) separate from each other. The wireless communication module 992 may identify and authenticate the electronic device 901 in a communication network, such as the first network 998 or the second network 999, using subscriber information (e.g., international mobile subscriber identity (IMSI)) stored in the SIM 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., a mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element including a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to an embodiment, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the external electronic devices 902 or 904 may be a device of a same type as, or a different type from, the electronic device 901. According to an embodiment, all or some of operations to be executed at the electronic device 901 may be executed at one or more of the external electronic devices (e.g., the external devices 902 and 904, and the server 908). For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In an embodiment, the external electronic device 904 may include an Internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5Gf communication technology or IoT-related technology.

The electronic device according to the embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if a component (e.g., a first component) is referred to, with or without the term "operatively" or "communicatively", as "coupled with," "coupled to," "connected with," or "connected to" another component (e.g., a second component), it means that the component may be coupled with the other component directly (e.g., wiredly), wirelessly, or via a third component.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device 100, 901 may include a memory 140, 930 including instructions, and at least one processor 110, 920 electrically connected to the memory 140, 930 and configured to execute the instructions. When the instructions are executed by the at least one processor 110, 920, the at least one processor 110, 920 may cause the electronic device 100, 901 to control a plurality of operations. The plurality of operations may include setting a first time interval in which a feedback receiver 121 operates in a spurious emission detection mode. The plurality of operations may include obtaining a feedback signal in a first frequency band via the feedback receiver based on a first resolution bandwidth in the first time interval. The plurality of operations may include determining whether a spurious emission is in the frequency band by analyzing the feedback signal, and in response to determination that the spurious emission is in the frequency band. The plurality of operations may include determining whether a spurious emission is in a second frequency band included in the first frequency band based on a second resolution bandwidth narrower than the first resolution bandwidth. The feedback signal may correspond to a RF signal amplified by a PA 130 of the electronic device 100, 901.

The plurality of operations may further include initiating a process of setting the first time interval based on one or more of a temperature of the electronic device 100, 901 and a transmission power of the electronic device 100, 901.

The initiating may include initiating the process of setting the first time interval, when a current transmission power of the electronic device 100, 901 satisfies a threshold value.

The threshold value may be determined based on a maximum transmission power of the electronic device 100, 901.

The setting of the first time interval may include randomly arranging the first time interval and a second time interval. The second time interval may include a time interval in which the feedback receiver 121 operates in a different mode from the spurious emission detection mode.

The second time interval may include a time interval in which the feedback receiver 121 operates in a mode to compensate for a transmission power of the electronic device 100, 901.

The determining whether the spurious emission is in the frequency band may include determining whether the spurious emission is in the first frequency band, which is an adjacent frequency band of a current transmission frequency of the electronic device based on the first resolution bandwidth.

The plurality of operations may further include adjusting a bias current of the PA 130 based on the spurious emission.

The adjusting of the bias current may include determining a bias current range of the PA 130 based on one or more of a transmission quality of the electronic device 100, 901 and a transmission power of the electronic device 100, 901. The adjusting of the bias current may include adjusting the bias current of the PA 130 within the bias current range based on the spurious emission.

According to an embodiment, a method of determining a spurious emission may include setting a first time interval in which a feedback receiver 121 operates in a spurious emission detection mode. The method may include obtaining a feedback signal in a first frequency band via the feedback receiver based on a first resolution bandwidth in the first time interval. The method may include determining whether a spurious emission is in the frequency band by analyzing the feedback signal. The method may include in response to determination that the spurious emission is in the frequency band, determining whether a spurious emission is in a second frequency band included in the first frequency band based on a second resolution bandwidth narrower than the first resolution bandwidth. The feedback signal may correspond to a RF signal amplified by a PA 130 of the electronic device 100, 901.

The method may further include initiating a process of setting the first time interval based on one or more of a temperature of the electronic device 100, 901 and a transmission power of the electronic device 100, 901.

The initiating may include initiating the process of setting the first time interval, when a current transmission power of the electronic device 100, 901 satisfies a threshold value.

The threshold value may be determined based on a maximum transmission power of the electronic device 100, 901.

The setting of the first time interval may include randomly arranging the first time interval and a second time interval. The second time interval may include a time interval in which the feedback receiver 121 operates in a different mode from the spurious emission detection mode.

The second time interval may include a time interval in which the feedback receiver 121 operates in a mode to compensate for a transmission power of the electronic device 100, 901.

The determining whether the spurious emission is in the frequency band may include determining whether the spurious emission is in the first frequency band, which is an adjacent frequency band of a current transmission frequency of the electronic device based on the first resolution bandwidth.

The method may further include adjusting a bias current of the PA 130 based on the spurious emission.

The adjusting of the bias current may include determining a bias current range of the PA 130 based on one or more of a transmission quality of the electronic device 100, 901 and a transmission power of the electronic device 100, 901. The adjusting of the bias current may include adjusting the bias current of the PA 130 within the bias current range.

The effects to be achieved are not limited to those described above, and other effects not mentioned above will be clearly understood by one of ordinary skill in the art from this document.

What is claimed is:

1. An electronic device comprising:
- a memory storing instructions; and
- at least one processor electrically connected to the memory and configured to execute the instructions,
- wherein, based on the instructions being executed by the at least one processor, the at least one processor causes the electronic device to control a plurality of operations, and
- wherein the plurality of operations comprises:
  - setting a first time interval in which a feedback receiver operates in a spurious emission detection mode,
  - obtaining a feedback signal in a first frequency band via the feedback receiver based on a first resolution bandwidth in the first time interval,
  - determining whether a spurious emission is in the frequency band by analyzing the feedback signal, and
  - in response to determination that the spurious emission is in the frequency band, determining whether a spurious emission is in a second frequency band included in the first frequency band based on a second resolution bandwidth narrower than the first resolution bandwidth,
  - wherein the feedback signal corresponds to a radio frequency (RF) signal amplified by a power amplifier of the electronic device.

2. The electronic device of claim 1, wherein the plurality of operations further comprise initiating a process of setting the first time interval based on one or more of a temperature of the electronic device and a transmission power of the electronic device.

3. The electronic device of claim 2, wherein the initiating comprises initiating the process of setting the first time interval, based on a current transmission power of the electronic device satisfying a threshold value.

4. The electronic device of claim 3, wherein the threshold value is determined based on a maximum transmission power of the electronic device.

5. The electronic device of claim 1, wherein the setting of the first time interval comprises randomly arranging the first time interval and a second time interval,
- wherein the second time interval comprises a time interval in which the feedback receiver operates in a different mode from the spurious emission detection mode.

6. The electronic device of claim 5, wherein, during the second time interval, the feedback receiver is configured to compensate for a transmission power of the electronic device.

7. The electronic device of claim 1, wherein the determining whether the spurious emission is in the frequency band comprises:
- determining whether the spurious emission is in the first frequency band, which is an adjacent frequency band of a current transmission frequency of the electronic device based on the first resolution bandwidth.

8. The electronic device of claim 1, wherein the plurality of operations further comprises adjusting a bias current of the power amplifier based on the spurious emission.

9. The electronic device of claim 8, wherein the adjusting of the bias current comprises:
- determining a bias current range of the power amplifier based on one or more of a transmission quality of the electronic device and a transmission power of the electronic device; and
- adjusting the bias current of the power amplifier within the bias current range based on the spurious emission.

10. A method of determining a spurious emission of an electronic device, the method comprising:
- setting a first time interval in which a feedback receiver operates in a spurious emission detection mode; and
- obtaining a feedback signal in a first frequency band via the feedback receiver based on a first resolution bandwidth in the first time interval,
- determining whether a spurious emission is in the frequency band by analyzing the feedback signal, and
- in response to determination that the spurious emission is in the frequency band, determining whether a spurious emission is in a second frequency band included in the first frequency band based on a second resolution bandwidth narrower than the first resolution bandwidth, wherein the feedback signal corresponds to a radio frequency (RF) signal amplified by a power amplifier of the electronic device.

11. The method of claim 10, further comprising:

initiating a process of setting the first time interval based on one or more of a temperature of the electronic device and a transmission power of the electronic device.

12. The method of claim 11, wherein the initiating comprises initiating the process of setting the first time interval, based on a current transmission power of the electronic device satisfying a threshold value.

13. The method of claim 12, wherein the threshold value is determined based on a maximum transmission power of the electronic device.

14. The method of claim 12, wherein, during the second time interval, the feedback receiver is configured to compensate for a transmission power of the electronic device.

15. The method of claim 10, wherein the setting of the first time interval comprises randomly arranging the first time interval and a second time interval, wherein the second time interval comprises a time interval in which the feedback receiver operates in a different mode from the spurious emission detection mode.

16. The method of claim 10, wherein the determining whether the spurious emission is in the frequency band comprises:

determining whether the spurious emission is in the first frequency band, which is an adjacent frequency band of a current transmission frequency of the electronic device based on the first resolution bandwidth.

17. The method of claim 10, further comprising:

adjusting a bias current of the power amplifier based on the spurious emission.

18. The method of claim 17, wherein the adjusting of the bias current comprises:

determining a bias current range of the power amplifier based on one or more of a transmission quality of the electronic device and a transmission power of the electronic device; and adjusting the bias current of the power amplifier within the bias current range based on the spurious emission.

* * * * *